United States Patent [19]

Mian

[11] Patent Number: 4,904,939

[45] Date of Patent: Feb. 27, 1990

[54] PORTABLE ELECTRONIC WHEEL WEAR GAUGE

[75] Inventor: Zahid F. Mian, Troy, N.Y.

[73] Assignee: International Electronic Machines Corp., Troy, N.Y.

[21] Appl. No.: 245,780

[22] Filed: Sep. 16, 1988

[51] Int. Cl.$^4$ .......................... G01B 7/02; G01B 7/10; G01D 5/34; B61K 9/12

[52] U.S. Cl. .................. 324/229; 33/203.11; 33/651; 246/169 R; 250/231 SE; 324/207.13; 324/226; 324/207.24; 364/560

[58] Field of Search ............... 324/207, 226, 227, 229, 324/232; 250/231 R, 231 SE; 341/13; 33/203, 203.11, 203.18, 548, 551, 552, 651; 73/104, 146; 246/169 R, 169 D; 364/560–563

[56] References Cited

U.S. PATENT DOCUMENTS

| | | | |
|---|---|---|---|
| 3,221,412 | 12/1965 | Jean-Marie et al. | 33/548 |
| 4,268,968 | 5/1981 | Przybylinski et al. | 33/548 |
| 4,407,072 | 10/1983 | Hoskins | 33/203.11 |

FOREIGN PATENT DOCUMENTS 0007227 1/1980 European Pat. Off. .
2183840 10/1987 United Kingdom .

OTHER PUBLICATIONS

Field Manual of the AAR Interchange Rules, 1988; published by Assoc. of American Railroads, pp. 222–223.

Association of American Railroads, Mechanical Div., Manual of Standards and Recommended Practices, p. G–98, 12/1/78.

Primary Examiner—Gerard R. Strecker
Attorney, Agent, or Firm—Heslin & Rothenberg

[57] ABSTRACT

A portable, battery powered, electronic wheel wear gauge is described for use in train wheel wear measurements. The gauge consists of a portable computer controller electrically connected to a portable gauge head. The gauge automatically determines proper positioning of the gauge head with respect to a wheel and then automatically measures rim thickness, flange thickness, flange height and, optionally, rim diameter of a train wheel using suitable contact and non-contact sensors. The measurement readings are displayed and can be stored in a non-volative memory of the controller for subsequent transfer to another computer or a printer.

20 Claims, 9 Drawing Sheets

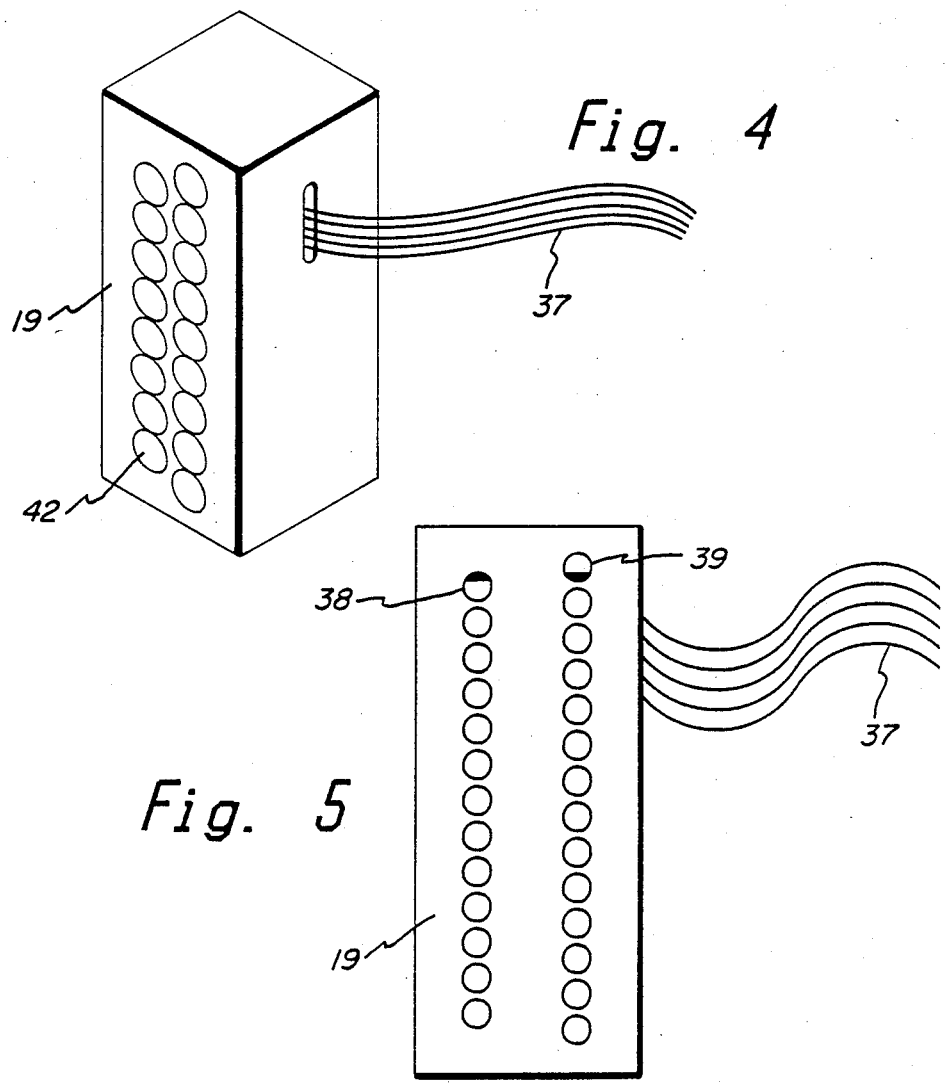
*Fig. 4*
*Fig. 5*
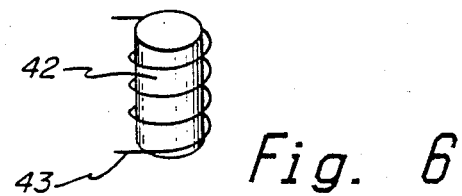
*Fig. 6*

PORTABLE ELECTRONIC WHEEL WEAR GAUGE

BACKGROUND OF THE INVENTION

This invention relates to train wheel wear measurement gauges and instruments and more particularly, to a wheel wear measurement system which is small, portable and capable of providing repeatability to all critical wheel wear measurement readings irrespective of the operator.

Train wheels are subject to normal wear due to friction contact between the wheel and the rail. As the train wheels wear out, the rim thickness and flange thickness decrease and the flange height increases. There is a need to accurately measure the rim thickness, flange thickness, and flange height in order to ensure that the wheels in operation have enough metal on them. These safety check measurements take place in train yards and in train shops. Similar measurements are used in recutting (wheel truing) the wheels to restore wheel profile as the wheel wear exceeds certain permissible tolerances of flange height, and flange thickness. The wheel truing operation takes place in train shops. Also, similar measurements are used by the wheel manufacturers for production quality control of train wheels.

Historically, these measurements have been taken using mechanical calipers. One such widely used mechanical wheel gauge looks like an inverted "J". In use, the readings are read and recorded by the operator directly off the mechanical gauge while it is placed on a wheel. There are several drawbacks, however, to such a mechanical gauge in all of the above mentioned applications. In an installed train wheel situation, for example, there are two major problems. First, the train wheel has quite a few mechanical parts such as brakes, shock absorbers and axle support mechanism around it. These measurements have accordingly been extremely difficult to take with the mechanical gauge because of the limited space around the wheel and location of a flange on a train wheel (towards the inside of a track). Second, the poor ambient conditions where the measurements are made, such as dim light make this task extremely difficult to perform. Further, operator dependent manual recording errors of these measurements, and keypunch errors, make this important wheel wear monitoring process on installed wheels very undependable. Measurement error can lead to three problems for the railroad. First, unacceptable wheels can remain in service providing an uncomfortable ride and posing a significant safety and liability hazard; second, wheels can be condemned which should be trued; and third, wheels which should be condemned are sometimes sent for truing, resulting in a disruption of the work flow in the wheel truing shop.

The mechanical gauge has been in use since 1923. Nevertheless, every year a number of train accidents are attributed to excessively worn out wheels. Inattention to excessively worn out wheels by train maintenance staff due to measurement errors, contributes to this safety risk. Several train companies have invested heavily in computerized wheel management systems which are designed to automate the wheel maintenance process. However, the current mechanical gauge does not provide accurate measurements to feed the computerized wheel management systems. Furthermore, the wheel maintenance staff cannot restore a wheel to the prescribed profile when they are unable to take accurate wheel wear measurements.

Several attempts have been made to automate the wheel wear measurement process. One arrangement is featured in a published U.K. Patent application No. GB 2183840A (published June 10, 1987, Martti Kurkinan, inventor). This arrangement measures only rim profile using an electro-mechanical contact probe which travels across the rim. Measured profile is compared with a good reference profile gathered using a second probe. Another arrangement is mentioned in a European patent application, publication No. EP 0007227A1 (W. H. Steel, et al., inventors). This arrangement suggests using a high intensity light source and a TV camera to gather information about surface profile. There are several problems with these rim profile measurement arrangements such as non-portability, inability to gather other vital measurements, and significant mechanical wear of the instrument.

Therefore, there presently exists a genuine need for a portable electronic train wheel gauge capable of improving the integrity of the wheel wear measurement process by facilitating accurate and repeatable wheel wear measurements, ensuring proper gauge head alignment with respect to the wheel, reducing the opportunities for operator errors, and by directly feeding the maintenance computer.

SUMMARY OF THE INVENTION

Accordingly, a principal object of the present invention is to provide a portable wheel wear measurement system capable of providing all three critical wheel wear measurements electronically, automatically, rapidly and accurately.

Another object of the invention is to increase railroad safety, comfort and efficiency.

Another object is to provide a wheel wear gauge which can be used to efficiently and accurately measure rim thickness, flange height and flange thickness of installed railroad wheels, in situ; is easy to use, durable, flexible and reliable; and can be readily and cost effectively manufactured.

Another object of the present invention is to provide a gauge capable of taking all three readings in a single application of the gauge head to the train wheel so as to reduce the measurement taking time.

Another object of the present invention is to provide a gauge which permits consistently accurate measurements no matter who uses the gauge to take the measurements; minimizes operator introduced measurement, recording, transcription and calculation errors; and ensures proper positioning of the gauge head with respect to a wheel before the measurements are taken.

Still another object of the invention is to provide an electronic wheel wear measuring instrument which is very rugged and can provide accurate measurements in a harsh environment year after year.

Yet another object of the present invention is to provide a gauge which can automatically store the measurement data, retain the data for an extended period of time, and then directly transfer the data to another computer or a printer.

It is a further object of the present invention to make the wheel wear gauge portable so that it can be conveniently carried anywhere it is needed.

It is a still further object of the present invention to provide a rechargeable battery powered wheel wear gauge so that the operator does not need to plug this device into a wall power outlet in order to use the gauge out in a train yard.

The present invention accomplishes these objects by providing a portable, rechargeable, and battery powered wheel wear measurement system that will take all three wheel wear readings electronically. Preferably, the readings are taken automatically upon proper positioning of a gauge head and then stored in a computer controller's non-volatile memory. The wheel wear gauge of the present invention consists of two primary components: a battery powered portable computer controller, and a gauge head. A wiring harness connects the controller to the gauge head. The portable controller incorporates a keyboard and a liquid crystal display (LCD) for user interface; the gauge head incorporates the electronic sensors. Unique aspects of this invention include:

First, this invention increases the accuracy of the three critical readings, i.e. flange height, flange thickness, and rim thickness, by using electronic sensors located in the gauge head to acquire the measurement data. In the presently preferred embodiment, three different types of electronic sensors are employed: positioning sensors for detecting proper alignment of the gauge head with a wheel to be measured, absolute position encoder sensors for determining flange thickness and height, and non-contact edge detection sensors for measuring rim thickness.

Second, this invention preferably ensures that the gauge is properly aligned with respect to the wheel before any measurement is taken. This is accomplished by providing multiple positioning sensors distributed along the two axes of the gauge head motion. When the gauge head is placed against the wheel, the positioning sensors connect to the wheel and perform a high impedance contact continuity test under microcontroller control. All of the positioning sensors have to conduct simultaneously to allow the control unit to perform any of the three measurements. As soon as all of the positioning sensors signal the control unit that the gauge head is properly positioned, i.e. all of the sensors are conducting simultaneously, the control unit instructs the gauge head to instantly take the measurements.

Third, this invention preferably takes the readings automatically under microcontroller control. Position encoder sensors that are located above the flange instantly make the flange thickness and flange height measurements. Concurrently, an edge sensor located on the flange side of the wheel takes the rim thickness measurement. The operator is provided with an audible signal as soon as the readings are taken.

Fourth, the readings can be advantageously stored in a non-volatile memory of the computer controller. The data in the memory is retained, even when the unit is turned off, through an internal rechargeable battery in the unit. After the operator has taken the readings, he can transfer the data to auxiliary equipment, e.g. a personal computer (PC) by connecting a cable to the controller unit and instructing the two computers, to communicate the information.

BRIEF DESCRIPTION OF THE DRAWINGS

These and other objects, features, aspects and advantages of the invention will be more readily understood from the following detailed description when read in conjunction with the accompanying drawings in which:

FIG. 4 is a perspective view of the rim thickness sensor assembly as shown in FIG. 2 and FIG. 3;

FIG. 5 is an enlarged front elevation of the rim thickness sensor assembly as shown in FIG. 4;

FIG. 6 is an enlarged perspective view of a single rim thickness pickup sensor;

DETAILED DESCRIPTION

Figure 1:
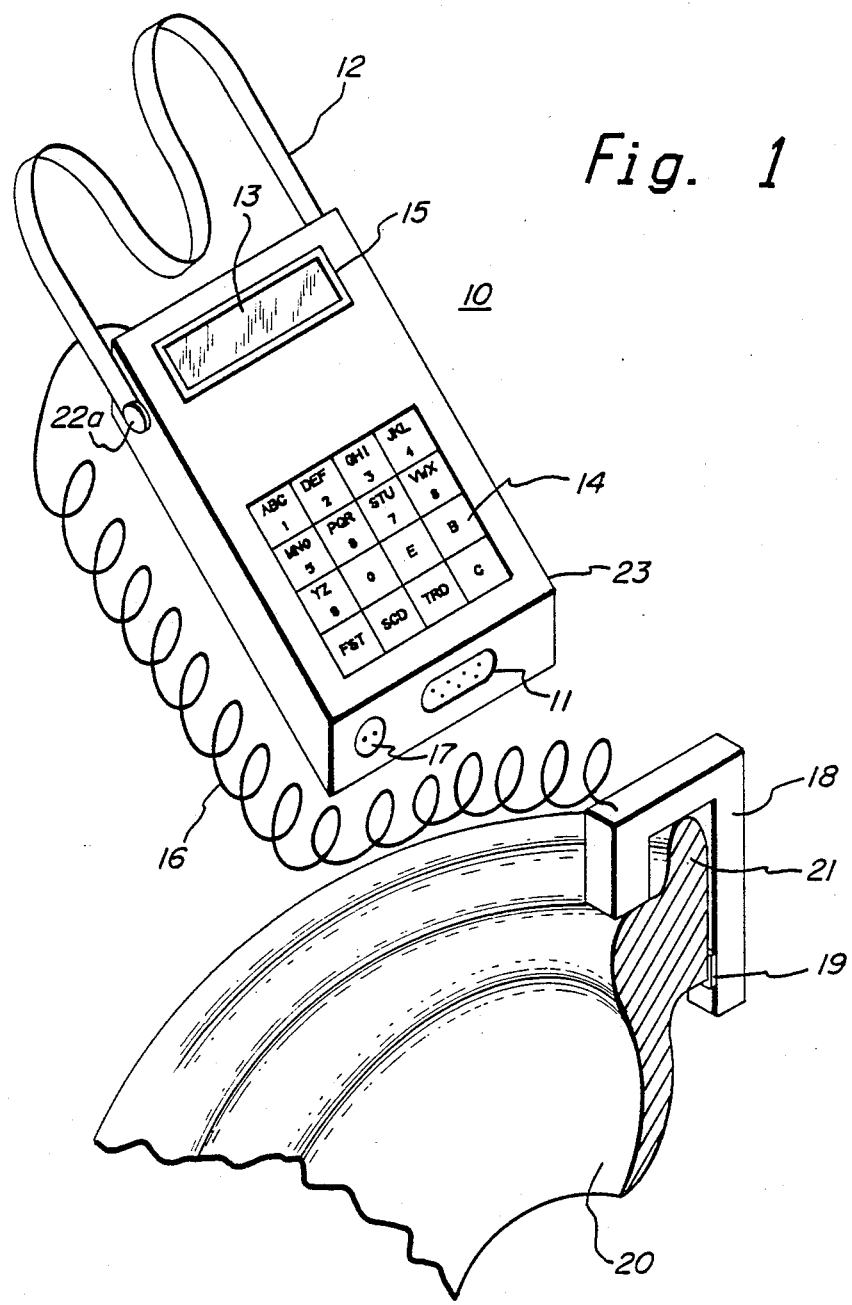
FIG. 1 is a perspective view of one embodiment of the wheel wear measurement system of the present invention shown taking readings on a train wheel.

A preferred embodiment of the wheel wear measurement system of the present invention, generally denoted as 10, is shown perspectively in FIG. 1. Wheel wear measurement system 10 includes a portable controller 23 attached to an electronic gauge head 18 through a wiring cable or harness 16. The controller 23 is portable and can be readily carried around using, for example, a neck strap 12 which is attached to the controller 23 by any suitable connecting means, e.g. two screws 22a and 22b (not shown). Screws 22a and 22b and strap 23 are preferably removable in order to convert the unit to a table or machine top unit.

The controller 23 provides the computer control and data acquisition and storage function for the wheel wear measurement system, as more fully described hereinafter. A user can input information into the controller 23 using the full travel, full alphanumeric keyboard 14. Results are displayed at a liquid crystal display 13 placed under the display bezel 15. The controller 23 is battery powered and can be recharged, in known fashion, using the battery recharge receptacle 17 at the bottom of the controller 23. After a user has measured a number of wheels, the measurement data can be downloaded to a personal or other computer, printer, etc. via communication port connector 11.

Figure 2:
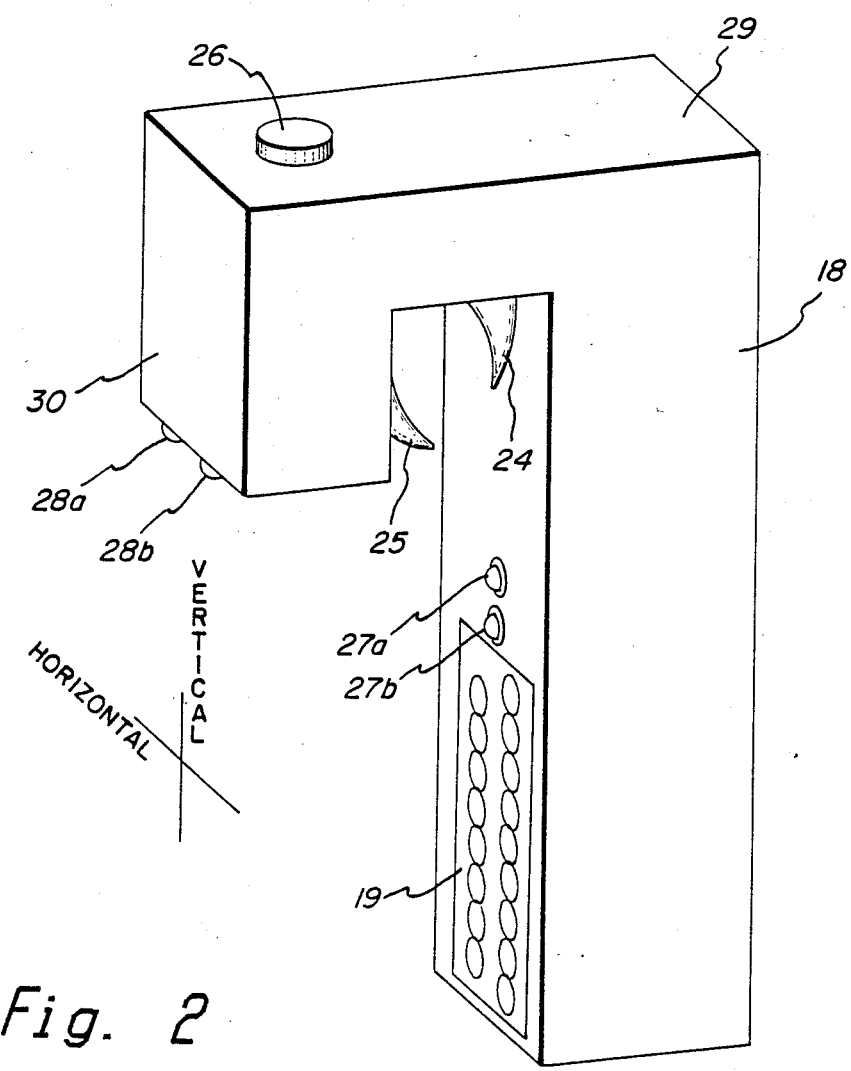
FIG. 2 is an enlarged perspective view of the wheel wear gauge head shown in FIG. 1.

Portable gauge head 18 houses the electronic sensors used to measure the dimensions of railway wheels 20. The gauge head has an inverted "J" shape and is configured to fit over flange 21 of the wheel 20 with the rim thickness sensor assembly 19 located adjacent the inner end of the wheel rim, like the conventional AAR mechanical gage as shown in FIG. 1. As best seen in FIG. 2, the gauge head 18 has a housing made, for example, of aluminum, and includes a removable top cover 29 and front cover 30 which provide access to the internal components of the gauge head. The gauge head 18 accommodates four types of sensors: rim thickness sensor assembly 19; positioning sensors 27a, 27b and 28a, 28b; flange height sensor 24; and flange thickness sensor 25 which provide measurement reading from the same frame of reference as the standard AAR mechanical gage.

Figure 3:
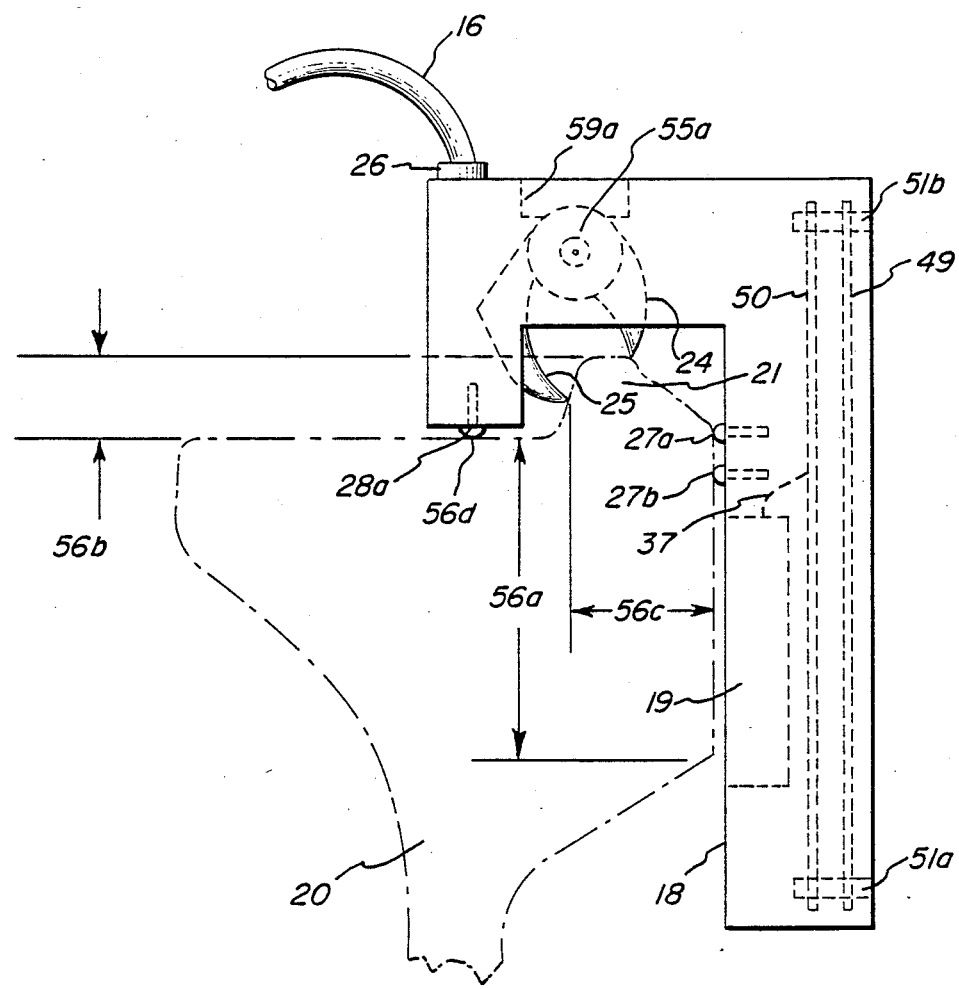
FIG. 3 is a side elevation of the gauge head of FIG. 2 positioned in alignment with a train wheel shown in phantom.

The positioning sensors 27a and 27b are located above the rim thickness sensor assembly 19. These two sensors ensure proper gauge head alignment in the vertical direction. Making contact with the flat upright portion of the rim as shown in FIG. 3, these sensors are preferably separated as far apart as possible. Positioning sensors 28a and 28b are located at the front of the gauge head and are designed to contact the flat tread surface of the wheel, as shown. These two sensors ensure proper gauge head alignment along the horizontal direction. The front sensors 28a and 28b are located precisely along the American Association of Railroads (AAR) specified gauging line 56d as documented in Manual G of AAR. The gauge head desirably includes at least four positioning sensors at the above mentioned locations. However, it is possible to use more than four sensors, say six sensors, where two will be located at the front and four above the rim thickness sensor assembly in a rectangular configuration. Before the controller 23 initiates any measurements, it ensures that the positioning sensors are all making adequate contact with the train wheel 20. This can be optimally accomplished through a high impedance contact continuity test applied through the positioning sensors. In this fashion, the positioning sensors ensure that the gauge head 18 is properly positioned so the system can take accurate, repeatable measurements.

The gauge head 18 also incorporates two flange measurement sensors 24 and 25. Sensor 25 takes flange thickness measurement when the gauge head 18 is placed over a flange 21. Similarly, sensor 24 takes flange height measurement when the gauge head 18 is placed over the flange 21. Simultaneously, sensor assembly 19 measures rim thickness. As shown in FIG. 3, the rim thickness is defined as 56a, flange height is defined as 56b and flange thickness is defined as 56c. The construction and operation of these different sensors are described hereinafter. All the sensors in the gauge head are activated electronically by, and provide output signals representative of measurement readings to, controller 23.

In order to accommodate the sensor electronics, the gauge head 18 has two circuit boards 49 and 50 in the back of the gauge head 18 which are mounted via supports 51a and 51b. The controller triggered drive electronics for the various sensor units is described hereinafter in conjunction with FIG. 12. Since all of the electronics in the gauge head 18 is connected to the controller 23 through a thin cable 16, sensor outputs are preferably multiplexed into as few lines as possible. The cable 16, can therefore, carry all of the signals between the gauge head 18 and the controller 23. Electrical signal interconnection cable 16 can be held in an aperture in top plate 29 of the gauge head 18 by a rubber washer 26 or other suitable means.

The rim thickness sensor 19 in gauge head 18 preferably operates on the electromagnetic principle of inducing eddy currents and detecting the presence of ferrous metals. Ferrous metals such as steel experience eddy currents when located in the neighborhood of an alternating electromagnetic field. These eddy currents affect the electrical current flowing through the coil responsible for producing the alternating electromagnetic field. One can measure the magnitude of these eddy currents using conventional electronics such as a current measurement bridge. The magnitude of such electrical current varies linearly with the distance between the metal and the coil.

Referring now to FIGS. 4-6, in the preferred embodiment of the invention, the rim thickness sensor assembly 19 consists of two rows of multiple ferrite cores 42 wound with insulated copper wire coil 43. These cores 42 produce an alternating electromagnetic field in the nearby steel rim. The ferrite cores in the two rows are arranged in a staggered fashion as shown in FIG. 5. The primary reason for staggering the cores is to provide overlap between each staggered pair of cores, such as 38 and 39, and thereby increase measurement accuracy. The designed overlap is one half the size of a core as illustrated by the shaded portions of cores 38 and 39 in FIG. 5. Therefore, one can obtain twice the accuracy of the minimum size core available. For example, using two inexpensive $\frac{1}{8}''$ external diameter cores (also called slugs) as a staggered pair, one can obtain 1/16" measurement accuracy. Similarly, one can obtain higher accuracies by providing greater overlap, say four cores overlapping one another by $\frac{3}{8}$ of core size resulting in four times the accuracy. These coils 43 are energized one at a time using a high frequency sinusoidal wave. A metallic object, i.e. the train wheel rim, nearby an energized core, causes a change in the coil's electrical current consumption which is detected using a conventional inductance bridge circuit connected to the cores 42 through the wiring harness 37. The computer controller 23 counts the total number of coils that undergo current change in order to determine the thickness of the rim of the wheel under test. This rim thickness measurement scheme has several outstanding advantages including: non-contact measurement of rim thickness resulting in long life of the system, high immunity to dirt and grease (not uncommon on train wheels), small size, high accuracy and repeatability of measurements, and low cost of manufacturing.

Figure 7:
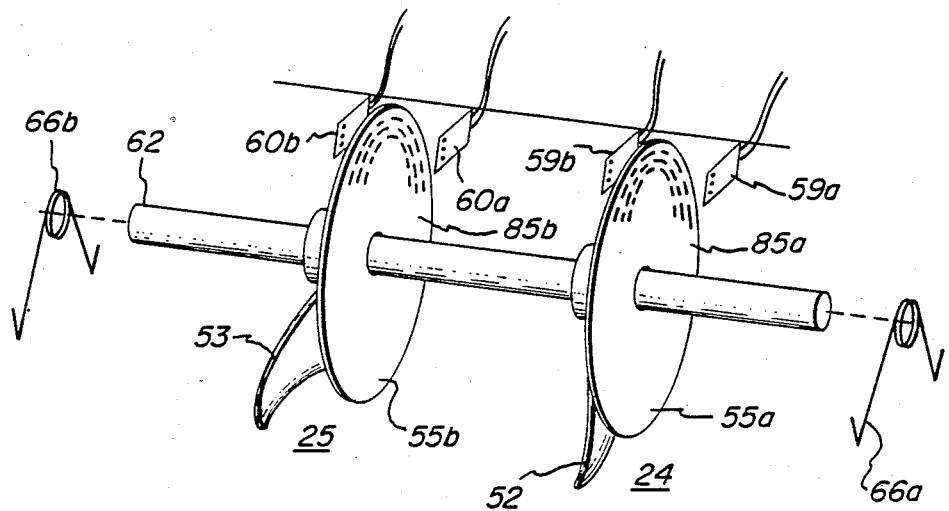
FIG. 7 is a perspective view of the flange height and flange thickness optical encoder assemblies of the gauge head shown in FIG. 2 and FIG. 3.
Figure 8:
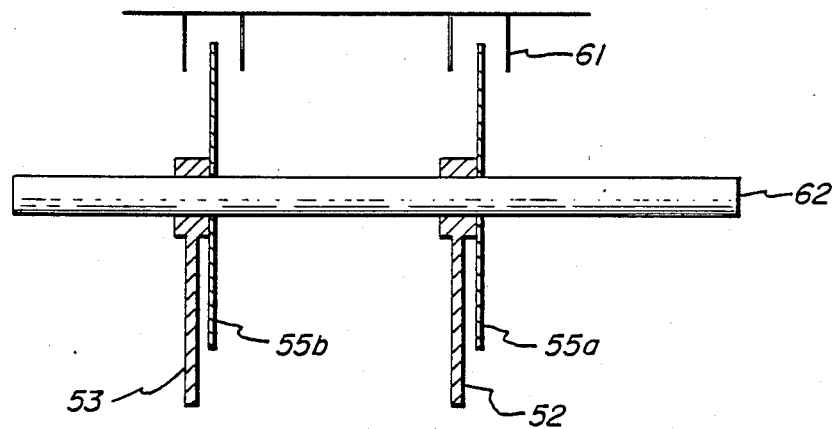
FIG. 8 is a front elevation of the optical encoder assemblies of FIG. 7.

Turning now to FIGS. 7 and 8, in the preferred embodiment of the invention, the flange height sensor 24 has a finger 52 which is attached to an optical encoder transparent plate 55a that is engraved with gray code tracks 85a indicating absolute position of the finger 52. Photo diodes 59a emit light through the gray code plate 55a and photo transistors 59b on the other side of the plate receive the light. At any time, the output of the photo transistors represents the absolute position in gray code that can be readily read by the controller 23. In the preferred embodiment of the flange thickness sensor 25, a finger 53 is attached to an optical encoder transparent plate 55b that is engraved with gray code tracks 85b indicating absolute position of the finger 53. In a scheme similar to that used with flange height sensor 24, phototransistors 60b detect light transmitted from photo diodes 60a through gray code plate 55b and provide output signals representative of the absolute position of the flange thickness finger 53. Both of the optical plates 55a and 55b rest on and are independently rotatable about a spindle 62. Flange height finger 52 has a spring 66a attached to it to position it firmly against the top portion of flange 21. Similarly, the flange thickness finger 53 has a spring 66b attached to it to position the finger firmly against the side of flange 21. The two spring loaded fingers 52 and 53 can be made to follow the same arcs as those on the conventional mechanical caliper, i.e. the AAR Steel Wheel Gauge. The optical encoding scheme described here provides a number of benefits: non-contact encoding of flange thickness and flange height resulting in long life of the system, extended temperature range operation, excellent measurement repeatability, high accuracy, and low cost manufacturing.

Figure 9:
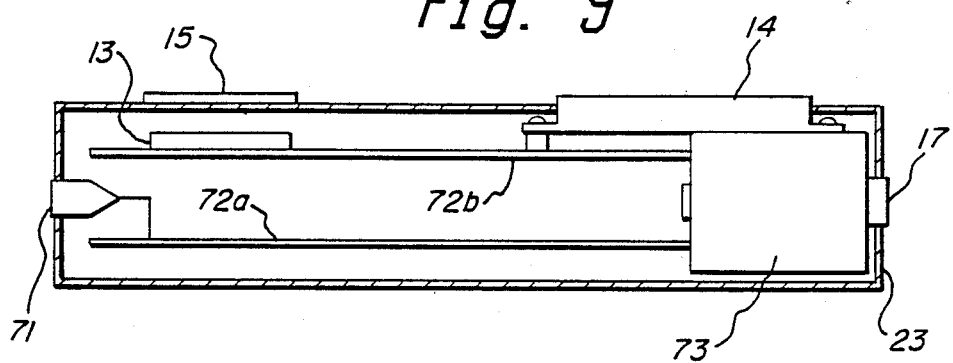
FIG. 9 is a cut-away side elevation of the controller as shown in FIG. 1.
Figure 10:
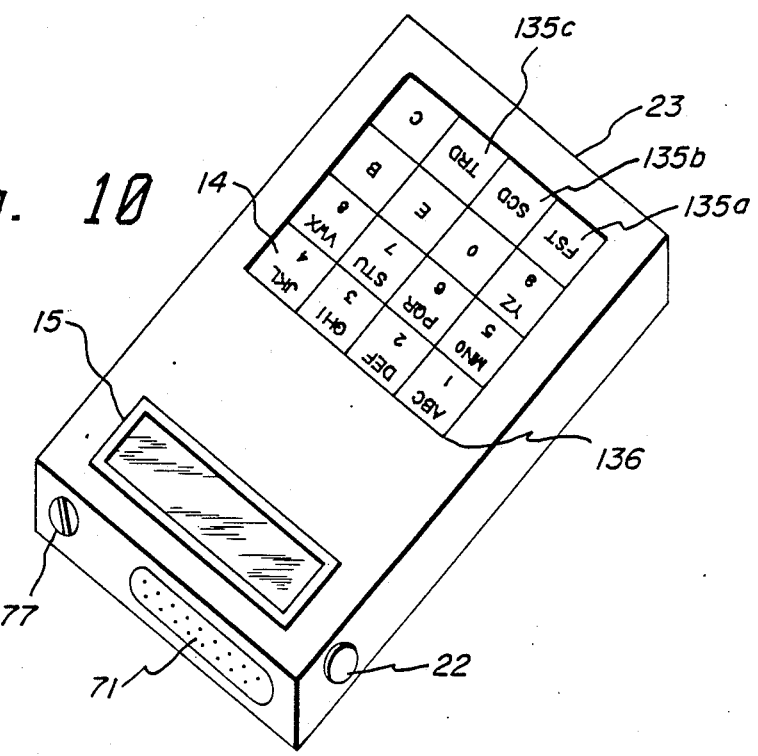
FIG. 10 is perspective view of the controller as shown in FIG. 9.

Referring generally now to FIGS. 9 and 10, further details of the construction of controller 23 are presented. The gauge head 18 is attached via cable 16 to the controller 23 at the connector 71. The cable 16 can be easily detached for gauge head replacement, if desired. The controller 23 has a liquid crystal display (LCD) 13 that provides excellent contrast ratio under all lighting conditions. Also, this display 13 consumes very little current which is important to the portable operation of the controller and to the extended operation of the rechargeable batteries 73 without having to recharge them. However, when needed, the internal batteries can be recharged through the connector 17 at the rear of the controller 23. By way of example, controller 23 may be powered by a battery pack consisting of four rechargeable C cell batteries which, when fully charged, will operate continuously for up to 12 hours. The system 10 can be turned on/off through the switch 77 provided next to the gauge head cable connector 71. The controller's circuitry is located on two circuit boards 72a ad 72b.

Figure 11:
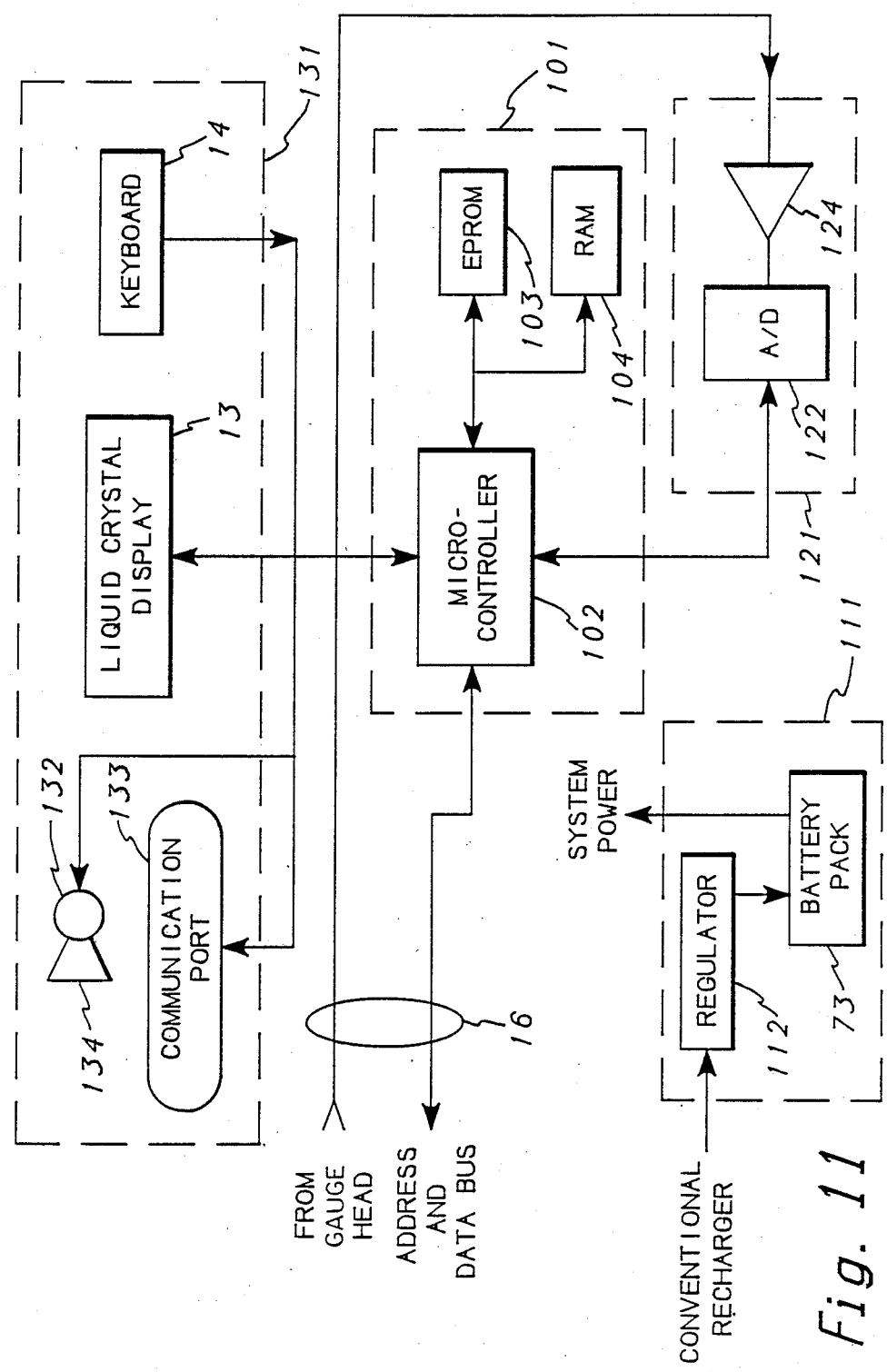
FIG. 11 is a block diagram of the controller electronics.

As shown in FIG. 11, the circuitry of controller 23 consists of four subsystems: controller subsystem 101, power supply subsystem 111, data acquisition subsystem 121, and operator input/output (I/O) subsystem 131. The controller subsystem provides the intelligence and memory for the system and includes a conventional 8-bit single chip micro-controller 102, e.g. an INTEL 8031. The assembly program code for the controller is stored in the associated 32 Kilo-Byte EPROM 103. The size of the EPROM can be increased to 64 Kilo-Byte depending on a specific application need. Any convention CMOS-EPPOM with these storage capabilities will meet the requirement. In order to store assembly program variable data and measurement data, the controller is provided with a 32 Kilo-Byte Non-Volatile, low power CMOS-RAM 104, e.g. HD 6264 LP. The power supply subsystem 111 is responsible for maintaining the CMOS-RAM's power supply needs even when the system is turned off. Though it may appear that the CMOS-RAM 104 will be a significant battery drain at all times, the standby current requirements of a conventional CMOS-RAM are so low that this technique will not require the operator to frequently recharge the battery.

The power supply subsystem 111 provides three main functions for the system 10. First, the subsystem 111 regulates a conventional battery recharger's output to meet the recharging requirements of internal batteries 73. This task is accomplished using conventional voltage regulator 112. The power supply subsystem also maintains the CMOS-RAM power while the internal batteries 73 are recharging. Second, the power supply subsystem provides the power to the system when it is taking the measurements. Third, the power supply subsystem provides the power to the CMOS-RAM while the system is off.

The data acquisition subsystem 121 consists of a conventional 8-bit analog-to-digital converter 122, and input voltage scaling amplifier 124. Any standard low power, high speed analog-to-digital converter will satisfy this need. The input to the converter 122 is scaled up using the amplifier 124 in order to measure small signal voltages. The input to the data acquisition subsystem comprises the rim thickness measurement data from gauge head 18.

The I/O subsystem 131 allows the operator to instruct the controller 23 through a full alphanumeric keyboard 14, display the measurement results on the LCD 13, communicate to other computers through communication port 133 connected to communication port connector 11, and provide audible signals through an audible alarm or tone generator 132 when the measurement is done. The keyboard 14 (see FIG. 10) is a sixteen key, full travel, low profile, multiplexed keyboard. However, other types of keyboards such as touch type, half travel, lighted, or telephone type can be used instead. In order to provide full alphanumeric capability on sixteen keys, the keyboard incorporates three alpha and one numeric character on each key. The numeric characters are accessible by just pressing the key. However, the alpha characters can be accessed by first pressing one of the keys 135a (FST for first), 135b (SCD for second), or 135c (TRD for third) and then pressing any corresponding key. For example, character "A" can be accessed by first pressing "FST" key 135a and then pressing "ABC" key 136.

The operator input is displayed on a high contrast, two lines of 16 characters each, twelve o'clock, low power, and smart LCD display 13. The display is of conventional type and any other microcontroller compatible display will work fine in this application. However, a light emitting type (LED) display should be avoided because of excessive power consumption.

The controller also incorporates an audible alarm 132 to alert the operator when a measurement is finished. The audible alarm 132 consists of a piezo-electric element 134 and a conventional piezo-electric driving circuit (not shown). The alarm produces a high pitch sound when activated by the micro-controller 102.

Serial interface to another computer for transferring data is accomplished through the internal UART (universal asynchronous receiver and transmitter) of microcontroller 102. The serial interface is brought out to the external connector 11 at the bottom of the housing of controller 23 through communication port 133.

Figure 12:
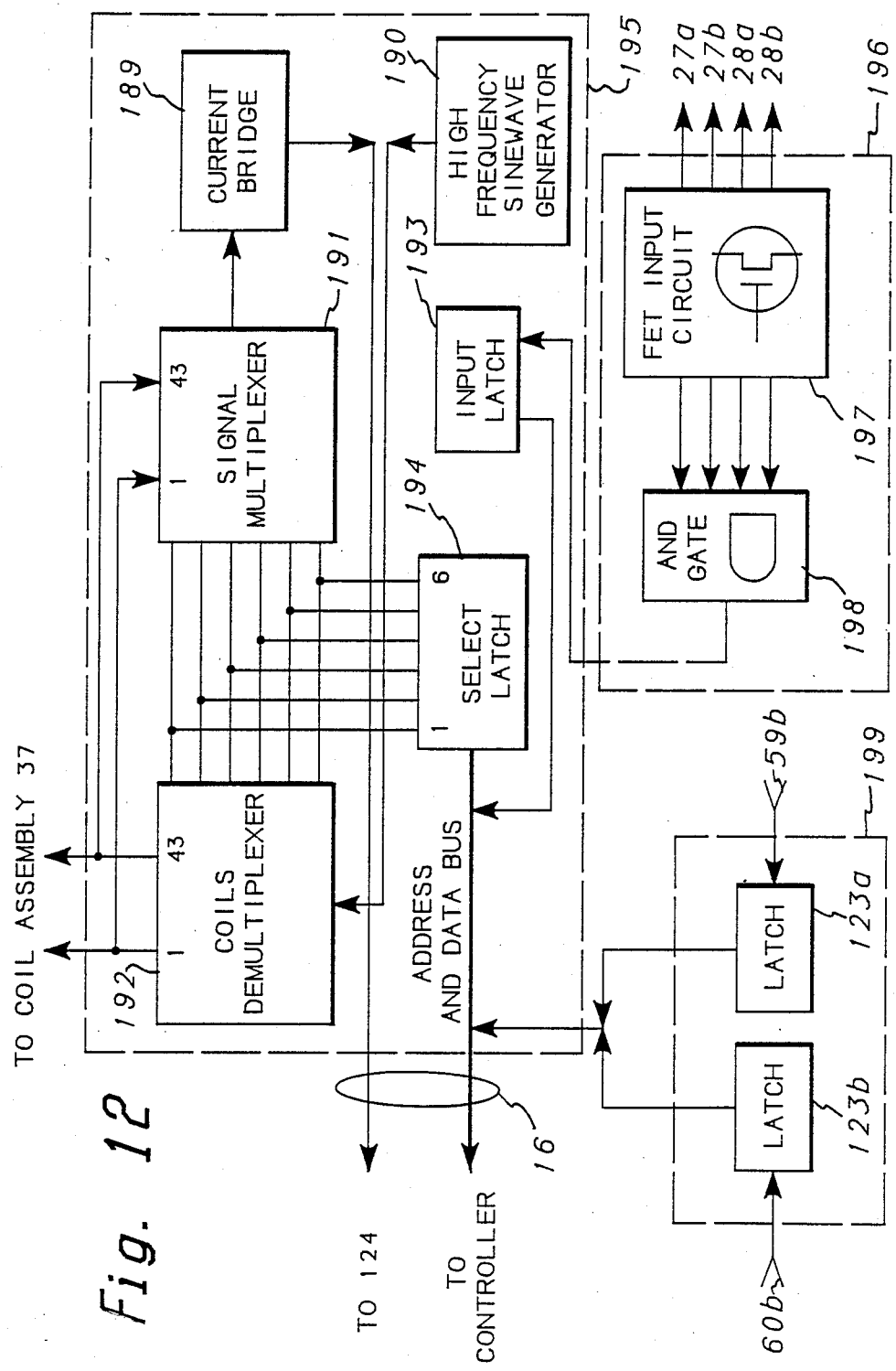
FIG. 12 is a simplified block diagram of the gauge head electronics.

The controller circuitry of FIG. 11 interfaces through cable 16 to the gauge head electronics depicted in FIG. 12. As mentioned earlier, the gauge head 18 contains two electronic boards 49 and 50 in the back of the gauge head 18 which are mounted via supports 51a and 51b. Boards 49 and 50 contain circuit subassemblies 195, 196 and 199. Subassembly 195 consists of coil demultiplexing circuit 192 and signal multiplexing circuit 191. In order to "address" a large number of rim edge detector coils through a few lines, the select latch 194 generates a binary coded decimal (BCD) address. The output of the address select latch 194 is connected to the coil demultiplexer chips and signal multiplexer chips. Multiplexing can be accomplished using a conventional chip such as CD4051BE and demultiplexing can be accomplished using a chip such as CD4051BE. Therefore, the controller can energize a large number of coils one at a time by writing the respective BCD address to the select latch 194 and connecting the high frequency sinewave generator 190 to the input of coil demultiplexer 192. While the address is still latched at the select latch 194, the controller can read back the proximity (rim edge detection) signal through the current bridge 189 from the selected coil. This analog output signal is transmitted to the previously described data acquisition subsystem 121 of the controller.

The subassembly 196 contains the electronics 197 for positioning sensors 27a, 27b, 28a and 28b and the necessary logic circuit 198 to signal the controller when all the positioning sensors are making contact simultaneously. The electronics 197 uses four conventional Field Effect Transistors (FETS) such as VN2222, operated in an open gate mode. The outputs of the four FETs directly drive a quad input AND gate 198. Commercially available AND gates such as 74HC08 can be configured to provide a quad input AND gate. The output of gate 198 is high when all of the contact sensors make contact to the wheel. This digital output is fed to input latch 193 which is read by the controller over the address and data bus.

The subassembly 199 connects the flange height sensor phototransistors 59b and flange thickness sensor phototransistors 60b to the conventional latches 123a and 123b. Commonly available latches such as 74HC573 can be used. The digital output of both of these latches ties into the address and data bus in subassembly 195 for communication back to the controller.

Controller 23 is a powerful data acquisition, management and storage system which receives measurement reading signals from the electronics of gauge head 18 and converts them to meaningful data records which it merges with wheel identification data entered through the keyboard 14 to produce standard formal or customized wheel reports which can be downloaded at the end of a shift into a printer or personal computer. In a typical application, where an operator wishes to take wheel measurements out in a train yard, the operator first inputs specific data such as the date, car number, truck number and wheel number into the controller 23 using the keyboard 14. The operator then places the gauge head 18 on the wheel and wiggles the gauge head 18 until he hears the end-of-measurement audible signal or beep. This beep indicates that the gauge head has been properly aligned and all of the measurements on the current wheel have been automatically taken by the system 10 and stored in the non-volatile RAM 104. Measurements for hundreds of wheels can be stored in this non-volatile memory. At the end of a shift, the operator connects the controller 23 to another computer through a conventional serial cable attached at connector 11. He then instructs the controller to send data to the other computer. After the transfer is completed, the controller 23 preferably beeps to inform the operator. Software for so operating the electronic wheel wear measuring system can be readily implemented by those skilled in the computer programming art and accordingly is not described in detail herein.

Figure 13:
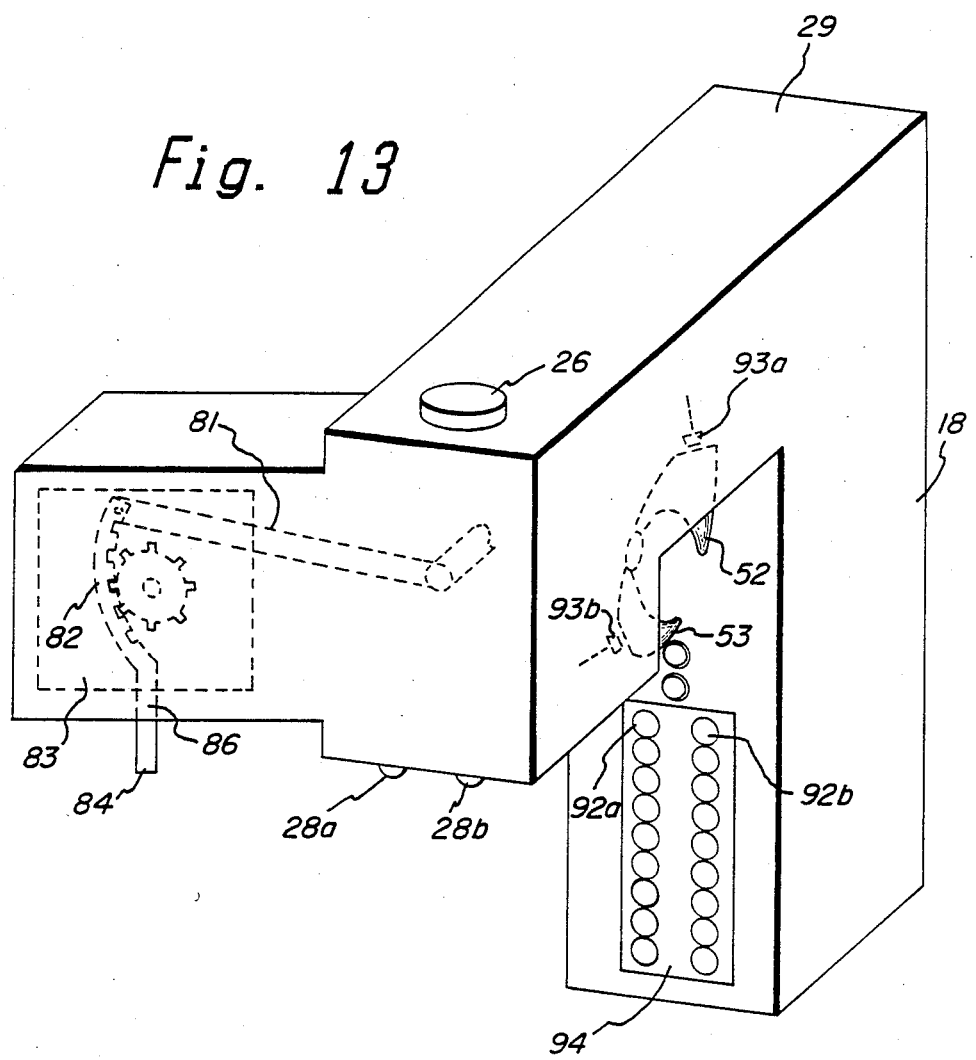
FIG. 13 is a perspective view of another embodiment of a gauge head of the wheel wear measurement system of the present invention capable of taking rim diameter and circumference readings, using eddy current sensors rather than optical encoders for flange measurements, and employing an optical rim thickness sensor assembly.

In another embodiment of the present invention illustrated in FIG. 13 in addition to the standard measurements, rim diameter is measured. As previously discussed, one would place the gauge head on the wheel to start taking the measurement. The tip 84 of arm 86 touches the rim and is vertically displaced thereby. Arm 86 is connected to a linear-to-rotary mechanism 82, so that variations in rim diameter sensed through displacement of the tip 84 are translated to rotary motion. The main reason for translating linear displacement to rotary motion is to obtain highly accurate measurement of the linear displacement. The linear-to-rotary mechanism feeds an off-the-shelf multi-turn rotary encoder 83. Therefore, a small linear movement of the tip 84 produces a full turn of the rotary encoder which can be easily resolved to 360 steps (one degree resolution encoder). Higher accuracies can be obtained using more accurate rotary encoders. The output from the rotary encoder is connected to the microcontroller directly for rim diameter measurement. Since rim circumference can be derived by multiplying rim diameter by 3.14 (circumference=PI*D), one can also obtain rim circumference using this technique.

In the alternate embodiment of the present invention shown in FIG. 13, the previously described electromagnetic rim thickness sensor 19 is replaced by another type of rim thickness sensor assembly 94 which uses optical reflection techniques to measure the rim thickness. The assembly 94 consists of a first row of photo emitters 92a and a second row of paired photo receivers 92b placed next to each other. By counting the number of receivers 92b receiving light reflected back from the rim, the sensor assembly 94 measures rim thickness. As a further alternative, the positions of the fingers 52 and 53 of the flange height and thickness sensors can be determined using eddy current sensors 93a and 93b instead of optical encoders.

From the foregoing description, it will be apparent that a portable electronic railway wheel wear gauge has been developed which eliminates the operator induced measurement errors and other deficiencies of the prior art. Since, in accordance with the present invention, measurement readings are taken electronically without the operator looking at the gauge head, and electronically recorded and subsequently transferred to a PC, measurement accuracy is significantly improved. Accuracy is further assured by the use of electronic sensors which are automatically activated when the gauge head is properly positioned. Improved measurement reading accuracy, in turn, results in safer wheels, as well as smoother wheels providing a more comfortable ride. As contrasted with the conventional mechanical caliper, the electronic wheel gauge of the present invention reduces paper work, reduces the time required to take a reading by over 80%, and provides a numeric control interface for a wheel truing machine.

The measurement data taken by the electronic gauge of the present invention can be displayed in the customary format as well as stored for direct entry into computerized maintenance management systems. The present invention eliminates down time of railroad operating equipment due to incorrect measurements, allows accurate forecasting of new wheel purchases and facilitates effective scheduling of wheel truing facilities. Furthermore, the improved quality of the wheel wear data provided by the invention will enable users to extend wheel life through more careful wheel maintenance activities.

For self-propelled transit cars, the electronic wear wheel gauge will afford the ability to take accurate readings in an environment constrained by a great deal of equipment which blocks access to the wheel and limits the ability of the operator to see the gauge head. For high-speed passenger cars, the ability of the present invention to take significantly more precise readings than current equipment will represent a major benefit. In all applications, the electronic gauge increases the speed and eliminates error in the measurement of railroad wheel wear. As far as known, the present invention represents the first and only portable, fully automated, electronic, digital train wheel wear gauge. The electronic wheel gauge is a durable, portable tool which is fully compatible with current industry practices and AAR standards. It provides precise, reliable measurements of flange and rim wear in seconds and is extremely easy to use. By eliminating operator induced error in the measurement of wheel profiles, the current invention enables wheel shop managers, locomotive maintenance officers, and car maintenance officers to: accurately and easily identify wheel wear patterns; optimize wheel truing schedules; minimize costly down time due to worn wheels; make multiple measurements quickly and accurately; develop and maintain an accurate current data base of wheel conditions; and more accurately forecast wheel requirements. The electronic wear gauge thus affords numerous significant benefits and represents a major step forward in this art.

Although several embodiments of the invention have been described and depicted, it will be apparent to those skilled in this art that various modifications, substitutions and the like can be made without departing from the spirit of the invention, the scope of which is defined by the claims appended hereto. For example, a version which quickly, easily and accurately performs the wheel measurements as described herein, without storing the data would exhibit a price/performance capability making it highly attractive to certain market segments. Likewise, other user interface devices may be used in implementing the invention. These and other variations which fall within the scope of the appended claims, are considered within the ambit of the present invention.

What is claimed is:

1. An electronic train wheel wear gauge comprising:
    a portable gauge head having a generally inverted J-shape with a first section configured to hook over a flange on rim of a train wheel and contact a tread of the wheel substantially along a known gauging line and a second section extending generally parallel to and abutting an outer face of the rim when the gauge head is properly positioned on the wheel;
    flange height sensing means located in the first section of said gauge head for interacting with a top surface of the flange, taking a measurement reading of flange height and providing a first electrical output signal representative thereof;
    flange thickness sensor means located in the first section of said gauge head for interacting with a known gauging point on an inner face of the flange, taking a measurement reading of flange thickness and providing a second electrical output signal representative thereof;
    rim thickness sensing means located in the second section of said gauge head for interacting with a radially inner edge of the outer face of the rim, taking a measurement reading of rim thickness and providing a third electrical output signal representative thereof; and
    output means responsive to said first, second, and third output signals for providing wheel wear information to an operator of said gauge.

2. The gauge of claim 1 further comprising positioning sensor means in said gauge head for determining proper positioning of the gauge head with respect to said wheel and providing an indication thereof.

3. The gauge of claim 2 further comprising control means for activating said flange thickness sensor means, flange height sensor means and rim thickness sensor means in response to said indication of proper positioning.

4. The gauge of claim 3 wherein said indication of proper positioning comprises a fourth electrical output signal and wherein said control means automatically activates said flange thickness sensor means, flange height sensor means and rim thickness sensor means in response to said fourth output signal.

5. The gauge of claim 4 wherein said control means concurrently activates said flange thickness sensor means, flange height sensor means and rim thickness sensor means in response to said fourth output signal.

6. The gauge of claim 5 further comprising non-volatile memory means for storing measurement readings taken by the sensor means of said gauge head.

7. The gauge of claim 6 wherein said control means and non-volatile memory means are located in a portable controller, said controller being electrically connected to said gauge head.

8. The gauge of claim 7 wherein said output means comprises visual display means located in said controller, and said controller further comprises: keyboard means for data entry by an operator, and communication port means for transferring measurement data from said non-volatile memory to auxiliary equipment.

9. The gauge of claim 8 wherein the controller further comprises rechargeable batteries for electrically powering the gauge.

10. The gauge of claim 1 wherein said rim thickness sensor means comprises a non-contact sensor assembly for determining the location of the radially inner edge of the outer face of said rim.

11. The gauge of claim 10 wherein said sensor assembly comprises a plurality of pairs of staggered eddy current sensors.

12. The gauge of claim 10 wherein said sensor assembly comprises a plurality of paired light emitters and light detectors.

13. The gauge of claim 10 wherein said flange thickness sensing means and flange height sensing means comprise spring loaded fingers, connected to absolute position encoding means, for contacting said gauging point and top surface of the flange, respectively.

14. An electronic wheel wear measurement system for measuring certain dimension of train wheels, comprising:
    a portable computer controller for acquiring measurement data, said controller being battery powered so that it can be carried around anywhere it is needed; and
    a portable electronic gauge head electrically connected to said controller, said gauge head having a generally inverted J-shape with a first section configured to hook over a flange on a rim of a train wheel and contact a tread of the wheel substantialy along a known gauging line and a second section extending generally parallel to and abutting an outer face of the rim when the gauge head is positioned on and in alignment with the wheel, said gauge head including positioning sensor means for providing an indication of alignment of the gauge head with respect to a wheel, said gauge head further including measurement sensor means interacting with known locations on said flange and rim for taking measurement readings of said certain dimensions and providing output signals representative of said measurement readings to said controller.

15. The measuring system of claim 14 wherein said controller further comprises control means for automatically activating said measurement sensor means in response to said indication of gauge head alignment.

16. The measuring system of claim 15 wherein said controller further comprises non-volatile memory means for storing measurement data.

17. The measuring system of claim 16 wherein said controller further comprises data display means, data entry means, and data transfer means.

18. The measuring system of claim 17 wherein said measurement sensor means comprises means for taking measurement readings of flange height, flange thickness and rim thickness concurrently.

19. The measuring system of claim 18 wherein said measurement sensor means further comprises means for concurrently taking a measurement reading of rim diameter.

20. The measuring system of claim 18 wherein said controller further comprises: rechargeable batteries for electrically powering the measuring system, and signal means for providing a signal to an operator upon completion of taking of the measurement readings.

* * * * *